Nov. 19, 1963   M. POSSATI   3,110,968
COMPARATOR MICROMETER, PARTICULARLY SUITED FOR
EXTERNAL AND INTERNAL MEASUREMENTS
Filed Sept. 12, 1960   2 Sheets-Sheet 1
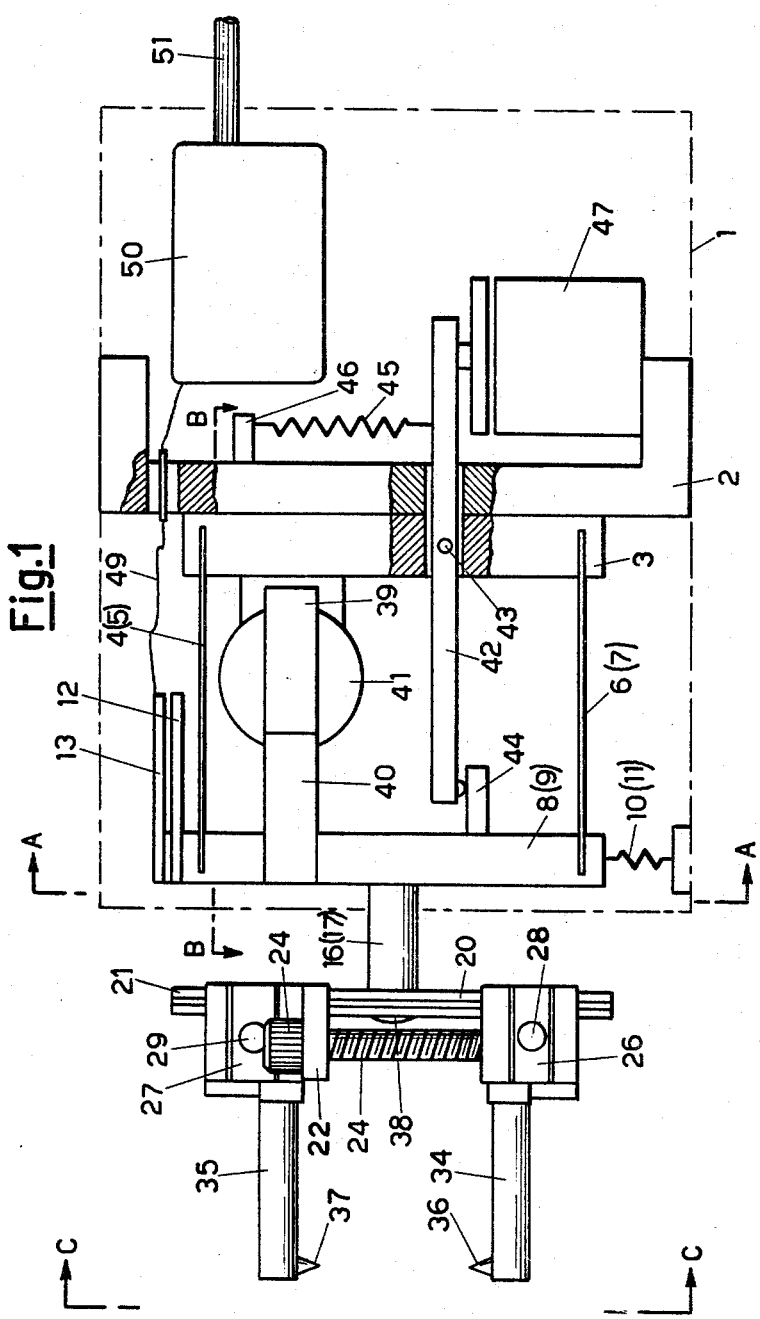
Inventor
Mario Possati
By Stevens Davis Miller & Mosher
Attorneys Nov. 19, 1963   M. POSSATI   3,110,968
COMPARATOR MICROMETER, PARTICULARLY SUITED FOR
EXTERNAL AND INTERNAL MEASUREMENTS
Filed Sept. 12, 1960   2 Sheets-Sheet 2
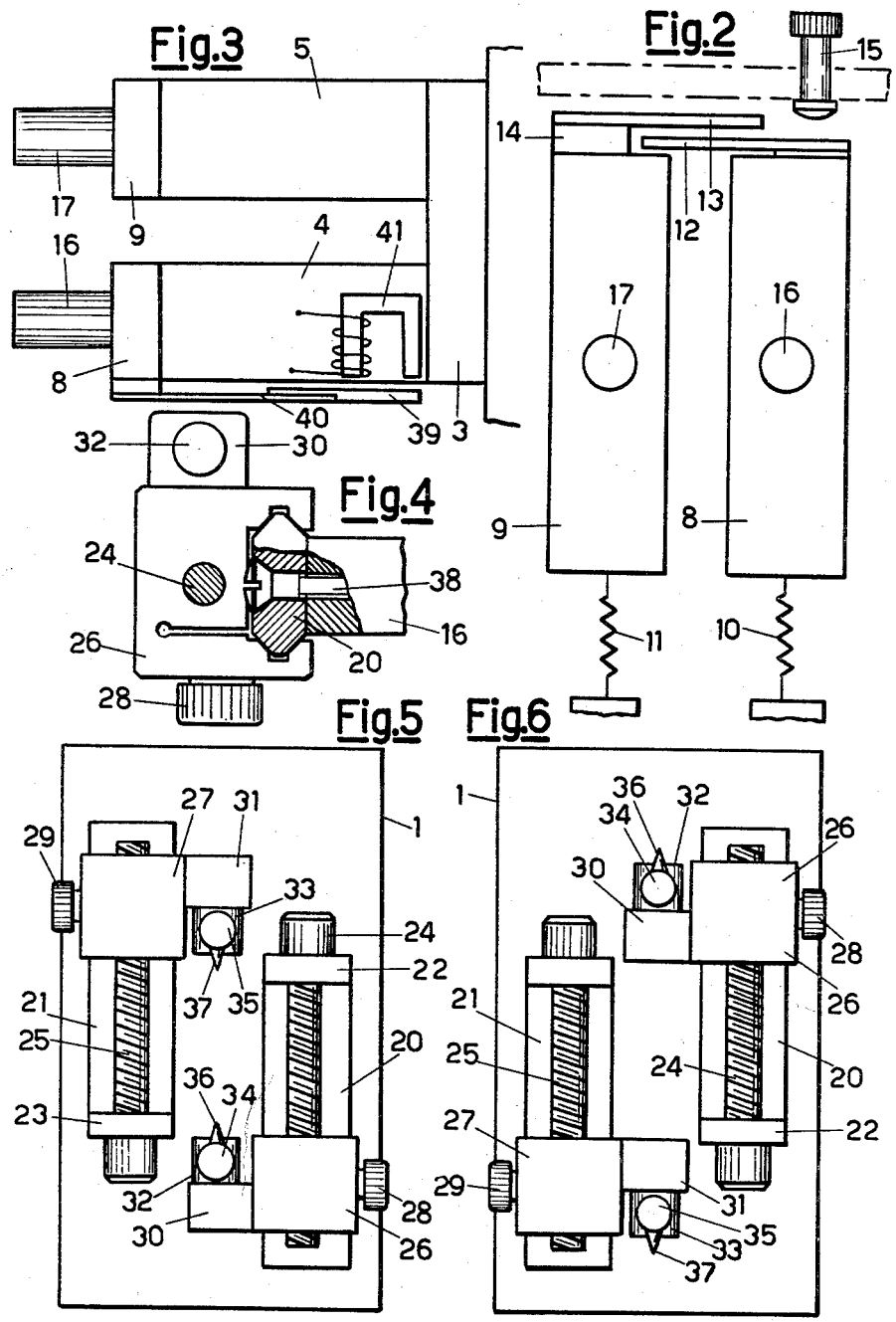
Inventor
Mario Possati
By Stevens, Davis, Miller & Mosher
Attorneys

United States Patent Office
3,110,968
Patented Nov. 19, 1963

3,110,968
COMPARATOR MICROMETER, PARTICULARLY SUITED FOR EXTERNAL AND INTERNAL MEASUREMENTS
Mario Possati, Via Borgonuovo 10, Milan, Italy
Filed Sept. 12, 1960, Ser. No. 55,332
Claims priority, application Italy Sept. 12, 1959
4 Claims. (Cl. 33—147)

It is an object of the present invention to provide a comparator micrometer particularly suited for carrying out measurement even continued in time, of workpieces in the course of being worked, for instance on a machine-tool.

The comparator is of the type comprising two mobile units, carrying each a feeler, which feelers are brought both to contact with the piece to be measured and pushed thereagainst substantially along the same line but in directions opposed to each other by two forces acting respectively upon the two aforesaid equipments, whose displacements relative to one another are measured by any suitable means which so provide the measure of the piece that is of interest.

This feature is described and protected by another patent entitled "Comparator Having Reed Supported Lockable Feelers and Capacitive Response Means," No. 2,836,-898, wherein the present applicant is a co-inventor.

In known apparatuses built with the aforesaid feature, the two units were arranged above each other, that is to say, at opposed sides with respect to a plane passing through the centre of the piece to be measured and perpendicular to the measuring line; under those conditions the head represented a considerable encumbrance, which constituted an inconvenience particularly in its applications on grinders, the head being in that case placed in front of the grinding wheel at the operator's side.

In extracting or inserting the work-piece the operator always would find the head before himself. In height, in fact, the head projected considerably above the horizontal plane passing through the axis of the centers.

The same inconvenience of the encumbrance appeared in the positioning on machines for interiors of small dimensions and to great extent in special applications on machines or benches. Moreover, to pass from an external measurement of a piece to the internal measurement of a cavity, with known apparatuses it was necessary to reverse the plates of the condenser serving as a means of electric measurement of the displacement of the units, to reverse the elastic action of the means producing the force of contrast on the units and to reverse the mode of acting of the device serving to block the feelers in position distanced from the piece; these inconveniences were due to the fact that a given displacement of the units in the case of an external measurement determined the approaching of the feelers to the external surface of the piece while in the case of an internal measurement the same displacement of the units determined on the contrary the distancing of the feelers from the inner wall of the cavity.

It is an object of the present invention to provide a comparator micrometer of the general kind mentioned above, which is of reduced encumbrance with respect to the known apparatuses and which permits to carry out external and internal measurement without needing the substantial modification mentioned above.

In the comparator according to the invention the two mobile units are arranged side by side and consequently the displacements of two corresponding points of the two units are constituted by two substantially parallel segments intersecting the same plane, as distinguished from what happened in the above cited conventional comparators, wherein the displacements of two corresponding points of the two units were constituted more or less accurately by two distinct segments of the same line.

The two units according to the invention carry two respective feelers in positions displaceable and mutually reversible along a direction parallel or substantially parallel to the directions along which the two units are displaced.

The accompanying drawings represent diagrammatically an apparatus according to the invention for the sole purpose of making clear how the characteristics above defined may be realized.

FIG. 1 is a side view, partly in section, of the apparatus.
FIG. 2 is a partial front view along the line A—A.
FIG. 3 is a partial plan view along the line B—B.
FIG. 4 is an enlarged detail showing the fastening of the feelers.
FIG. 5 is a front view along the line C—C and
FIG. 6 is the same view with the feelers reversed.

The structure of the apparatus represented diagrammatically comprises a casing indicated in the drawing by the sole internal contour 1. In that casing there is rigidly constrained a support 2 to which is rigidly fastened a piece 3; four elastic laminae 4, 5, 6, 7, placed two by two in two planes parallel to each other, are clamped each at one of its ends in the piece 3, while their other ends are fitted in two pieces 8 and 9 namely the laminae 4 and 6 in the piece 8 and the laminae 5 and 7 in the piece 9. The pieces 8 and 9 are so supported to overhang with respect to the fixed piece 3, by the aforesaid laminae and are susceptible to move perpendicularly with respect to the planes of said laminae while utilizing the elasticity thereof.

A spring or other equivalent means indicated diagrammatically at 10 urges the piece 8 upwards, while an analogous means indicated by 11 urges the piecec 9 downwards.

On the upper part of the piece 8 there is fixed a plate 12 and on the upper part of the piece 9 there is fixed a plate 13 with the interposition of an electrically insulating layer 14; these two plates find themselves facing each other and the plate 13 finds itself at a level higher than that of plate 12. Above the piece 8 the framing 1 carries a screw or other equivalent means to be operated from the outside, indicated diagrammatically with 15, by means of which it is possible to push the piece 8 gradually downwards while overcoming the action of the elastic means 10.

The pieces 8 and 9, at the side opposed to the aforesaid elastic laminae, carry respectively the extensions 16 and 17 whereon there are fixed by screws 38 the guides 20 and 21. The guide 20 carries a small plaque 22 in which is freely rotatable but axially constrained a screw 24 which screws-in in a slide 26 slidable on the guide 20 and to be clamped thereon by means of a screw 28. In analogous manner, on the guide 21 there can slide a slide 27 displaceable by means of a screw 25 rotatable but not axially displaceable in a plaque 23 rigid with the guide 21, a screw 29 serving to clamp the slide on said guide. In the position shown by FIGURES 1 and 5, the guide 20 extends to a greater amount downwards with respect to the extension 16 that carries it, while the guide 21 extends to a greater amount upwards.

The slide 26 carries projection 30 whereon there is fixed a small block 32 which serves to support rigidly the small rod 34 provided with the center 36 constituting a feeler member. In analogous manner the slide 27 carries a projection 31 with a small block 33 supporting the small rod 35 with the feeler center 37.

At 39 there is indicated a small block of magnetic material, fixed to the piece 8 by means of an elastic lamina 40, which can be attached by the electro-magnet 41 fixed to the casing 1 and can so block the movement of the piece 8 at cyclic intervals in known manner in the case of measurements of pieces in movement carrying parts, such as for instance grooves for keyes, which are to be subtracted to the action of the feeler centers. Of course also on the piece 9 an equal device is to be provided.

A lever 42, shown at 43, tends to lower the piece 8, while pressing upon the extension 44 thereof, by the action of an extension spring 45 constrained at 46 to the piece 2; an electromagnet 47 can contrast and overcome the action of the spring 45 and eliminate any action of the lever 42 upon the piece 8. Also for the piece 9 there is provided an analogous device not represented in the drawings for the sake of simplicity.

At 49 there is indicated a conductor which connects the insulated armature 13 of the condenser above described with an electric apparatus generally indicated with 50, adapted to detect the variation of capacity of such condenser and to transmit a current depending on said capacity in the cable 51 to a measuring apparatus known per se; for instance as explained in the above cited Patent No. 2,836,898.

In FIGURES 1 and 5 the apparatus is shown adapted to effect an external measurement.

To prearrange the apparatus in such a way that the feelers should measure the desired dimension of the pattern piece when the indicator marks the zero, by means of the screw or equivalent means 15, the piece 8 is brought to the position held suitable; in said operation the piece 9 follows the piece 8 because the spring 11 urges it downwards in such a way that the plate 13 always rests on the plate 12. Then one acts upon the screw 25 and one displaces the slide 27 on the guide 21 until the feeler center 37 comes to rest on the piece to be measured. Then one continues acting upon the screw 25 in the same direction; the parts 37, 35, 33, 31 being immobilized against the piece to be measured, the slide and the piece 9 are so pushed in upward direction and the plate 13 is moved away from the plate 12, which does not move because it is still blocked by the means 15, until the distance between the two plates 12 and 13 is such that the capacity of the condenser constituted thereby causes the zero indication or about zero on the indicator instrument not represented in the drawings. In that position the slide 27 is blocked on the guide 21 by means of the screw 29 and so the position of the feeler center 37 is made fixed with respect to the piece 9.

Subsequently the piece 8 is liberated by moving the blocking 15 away therefrom; the piece 8 moves under the action of the spring 10 until becoming stopped either by abutment of the plate 12 against the plate 13 or by abutment of the feeler center 36 against the pattern piece. By operating then the screw 24 one makes the slide 26 slide with respect to the guide 20 so that even if the feeler center 36 rests against the pattern piece one can take the piece 8 and consequently the plate 12 into such a position as to cause a capacity corresponding to the accurate indication of zero on the indicator instrument.

During the operations above described the electromagnet 47 remains energized and, therefore, the lever 42 leaves the piece 8 free to move and for analogous reason, as said above, also the piece 9 remains free.

When the replacement of the pattern piece by a piece to be measured or the replacement of such a piece by another one, is to be effected, the magnet 47 is de-energized whence the lever 42, urged by the spring 45, lowers the piece 8 and thereby takes the center 36 away from the piece which has been measured; in an analogous manner not represented, the same or another electromagnet detaches the other center 37 from said piece.

If an internal dimension is to be measured, such as for instance the diameter of a bore, the screws 38 are taken away and the two guides 20 and 21 are made to rotate by 180° thereby taking them into the position indicated in FIGURE 6, extracting therefrom the slides 26 and 27 and threading them again onto said guides in upside-down position while screwing off and on again therein the respective screws 24 and 25, turning upside-down the small rods 34 and 35 on the respective supports 32 and 33 in such a manner as to make them project outward again.

These are the sole operations required for adapting the apparatus to the measuring of interiors and it is evident how easy and rapid such a change is which does not require any intervention in the interior of the apparatus.

It is easy to imagine the variants which the structure of the apparatus above described may allow. For instance the guides 20 and 21 may extend at both sides with respect to their fastening screw 38; in that case it will be no longer necessary to turn upside-down the guides to pass from the measuring of exteriors to that of interiors it being sufficient to take the respective slides 26 and 27 towards the other end of each guide, after having detached provisionally one of the guides or utilizing a possible thinness and suitable arrangement of the rods of the feelers permitting one of these to surpass the position of the other one by elastic deformation.

So also the electric condenser constituted by the plates 12 and 13 may be replaced by another device measuring the displacements, of other kind, electric or mechanical. The elastic suspension of the pieces 8 and 9 may be realized in other ways and in particular the displacements of these pieces may be even not strictly rectilinear without influencing a sufficient accuracy of the measurements.

I claim:

1. A comparator micrometer comprising a base, two elongated guide members arranged in parallel side by side relationship with their longitudinal axes spaced from each other, means independently connecting each guide member to the base for movement thereof in the longitudinal direction of the guide member, means for moving said guide members in opposite longitudinal directions, a feeler slidably and reversably mounted on each of said guide members, means for clamping said feeler on its associated guide member and means for measuring the position of one of said guide members with respect to the other, said feelers having projections extending therefrom in opposed inward directions relative to the guide members, said projections being provided at their inner portions with contact centers which are aligned with each other as well as being inwardly offset relative to the guide members.

2. A comparator micrometer comprising a base, two elongated guide members equal and parallel to each other and arranged in side by side relationship with their longitudinal axes spaced from each other, means independently connecting each guide member to the base for movement thereof in the longitudinal direction of the guide member, means for moving said guide members in opposite longitudinal directions, a feeler slidably and reversably mounted on each of said guide members and provided with means for clamping it on its associated guide member, said feelers having projections extending therefrom in opposed inward directions relative to the guide members, said projections being provided at their inner portions with contact centers which are aligned with each other as well as being inwardly offset relative to the guide members, and means for measuring the position of one of said guide members with respect to the other.

3. A comparator micrometer comprising a base, two elongated guide members equal and parallel to each other and arranged in side by side relationship with their longitudinal axes spaced from each other, means independently connecting each guide member to the base for movement thereof in the longitudinal direction of the guide member, means for moving said guide members in opposite longitudinal directions, a feeler slidably and reversably mounted on each of said guide members and provided with means for clamping it on its associated guide member, said feelers having projections extending therefrom in opposed inward directions relative to the guide members, said projections being provided at their inner portions with contact centers which are aligned with each other as well as being inwardly offset relative to the guide members, a capacitor composed of two plates respectively secured to said guide members and an electrical circuit connected to said capacitor adapted to indicate the relative positions of said plates.

4. A comparator micrometer comprising a base, two elongated guide members equal and parallel to each other and arranged side by side to each other with their longitudinal axes spaced from each other, means independently connecting each guide member to the base for movement thereof in the longitudinal direction of the guide member, means for moving said guide members in opposite longitudinal directions, electromagnetic means for locking said guide members in a fixed position, a feeler slidably and reversably mounted on each of said guide members, means for clamping the feeler on its associated guide member, said feelers having projections extending therefrom in opposed inward directions relative to the guide members, said projections being provided at their inner portions with contact centers which are aligned with each other as well as being inwardly offset relative to the guide members, and means for measuring the position of one of said guide members with respect to the other.

References Cited in the file of this patent

UNITED STATES PATENTS 2,836,898     Possati et al. _____ June 3, 1958

FOREIGN PATENTS 567,401     Great Britain _____ Feb. 13, 1945